United States Patent
Yahata et al.

(10) Patent No.: US 8,955,307 B2
(45) Date of Patent: Feb. 17, 2015

(54) EXHAUST GAS PURIFYING SYSTEM FOR INTERNAL COMBUSTION ENGINE

(71) Applicant: Denso Corporation, Kariya, Aichi-pref. (JP)

(72) Inventors: Shigeto Yahata, Toyoake (JP); Tomohiro Ueno, Nagoya (JP)

(73) Assignee: Denso Corporation, Kariya (JP)

( * ) Notice: Subject to any disclaimer, the term of this patent is extended or adjusted under 35 U.S.C. 154(b) by 76 days.

(21) Appl. No.: 13/874,786

(22) Filed: May 1, 2013

(65) Prior Publication Data

US 2013/0298534 A1 Nov. 14, 2013

(30) Foreign Application Priority Data

May 11, 2012 (JP) ................. 2012-109289

(51) Int. Cl.
| | |
|---|---|
| *F01N 3/00* | (2006.01) |
| *F01N 3/02* | (2006.01) |
| *F01N 3/021* | (2006.01) |
| *F02D 41/14* | (2006.01) |
| *F02D 41/22* | (2006.01) |
| *F01N 13/00* | (2010.01) |

(52) U.S. Cl.
CPC ............ *F01N 3/021* (2013.01); *F02D 41/1439* (2013.01); *F02D 41/1466* (2013.01); *F02D 41/222* (2013.01); *F01N 13/008* (2013.01); *F01N 2560/05* (2013.01); *F02D 41/1441* (2013.01); *F02D 2400/08* (2013.01); *Y02T 10/40* (2013.01)
USPC .................... 60/276; 60/277; 60/288; 60/311

(58) Field of Classification Search
CPC ... F01N 3/021; F01N 13/008; F01N 2560/05; F01N 2560/14; F02D 41/1439; F02D 41/1441; F02D 41/1466; F02D 41/222; F02D 2400/08
USPC ............................ 60/276, 277, 287, 288, 311
See application file for complete search history.

(56) References Cited

U.S. PATENT DOCUMENTS

| | | | | |
|---|---|---|---|---|
| 5,408,215 A | * | 4/1995 | Hamburg ..................... | 340/439 |
| 8,763,380 B2 | * | 7/2014 | Sata ............................... | 60/300 |
| 2004/0200211 A1 | * | 10/2004 | Slaughter ....................... | 60/287 |
| 2008/0105567 A1 | | 5/2008 | Okayama et al. | |

(Continued)

FOREIGN PATENT DOCUMENTS

| | | |
|---|---|---|
| JP | 2006-266961 | 10/2006 |
| JP | 2007-132290 | 5/2007 |

(Continued)

OTHER PUBLICATIONS

Yahata, et al., U.S. Appl. No. 13/874,757, filed May 1, 2013.

*Primary Examiner* — Audrey K Bradley
(74) *Attorney, Agent, or Firm* — Nixon & Vanderhye P.C.

(57) ABSTRACT

In an ordinary mode, when an abnormality diagnosis of a PM sensor attached to a downstream opening downstream of a filter is performed, the PM sensor is moved to a first upstream opening upstream of the filter, and an exhaust gas is discharged from an engine. An ECU stores a program for the abnormality diagnosis. In an abnormality diagnosis mode, the ECU diagnoses the PM sensor by comparing an output value of the PM sensor to a standard output after performing the program. The first upstream opening may be closed by a cover in the ordinary mode.

6 Claims, 12 Drawing Sheets

(56) References Cited

U.S. PATENT DOCUMENTS

2011/0167808 A1*  7/2011  Kosaka et al. .................. 60/311
2013/0304359 A1   11/2013  Yahata et al.

FOREIGN PATENT DOCUMENTS

| | | |
|---|---|---|
| JP | 2007-315275 | 12/2007 |
| JP | 2010-275977 | 12/2010 |

\* cited by examiner

EXHAUST GAS PURIFYING SYSTEM FOR INTERNAL COMBUSTION ENGINE

CROSS-REFERENCE TO RELATED APPLICATION

This application is based on Japanese Patent Application No. 2012-109289 filed on May 11, 2012, the disclosure of which is incorporated herein by reference.

TECHNICAL FIELD

The present disclosure relates to an exhaust gas purifying system for an internal combustion engine.

BACKGROUND

Recently, a high exhaust gas purifying performance is requested in an internal combustion engine. Especially in a diesel engine, it is important to eliminate particulate matters (PM) emitted from the diesel engine. Usually, a diesel particulate filter (DPF) is provided in an exhaust pipe to eliminate the PM.

In order to improve the exhaust gas purifying performance, a configuration in which a PM sensor is provided downstream of the DPF may be necessary. By detecting an output value of the PM sensor, it can be determined whether a PM amount in the exhaust gas downstream of the DPF is decreased enough to a low level or whether the DPF is abnormal.

It is necessary that the PM sensor itself is normal so as to properly perform the above processing. Therefore, it is also important to properly detect whether the PM sensor is abnormal. JP-2010-275977A discloses an abnormality detector of the PM sensor.

The abnormality detector performs the abnormality diagnosis of the PM sensor in a time period just after a collecting rate of the DPF is low after the DPF is regenerated. It is not preferable that a time period for performing the abnormality diagnosis is limited.

Further, because the DPF is provided upstream of the PM sensor, it is difficult for the abnormality detector to determine whether the PM sensor is abnormal or whether the collecting rate is high so that the output value of the PM sensor is low. In a case where the collecting rate is high just after the DPF is regenerated, the abnormality detector may erroneously determine that the PM sensor is abnormal. Therefore, it is preferable that the abnormality diagnosis can be accurately performed without being affected by the collecting rate.

SUMMARY

It is an object of the present disclosure to provide an exhaust gas purifying system for an internal combustion engine which can diagnose whether a particulate matter (PM) sensor provided downstream of a diesel particulate filter (DPF) is abnormal without being affected by both a diagnosis timing of an abnormality diagnosis and a collecting rate of the DPF.

According to an aspect of the present disclosure, the exhaust gas purifying system includes a filter, a sensor and an opening. The filter is provided in an exhaust pipe of the internal combustion engine for collecting particulate matters. The sensor is provided at a first position of the exhaust pipe downstream of the filter for detecting an amount of the particulate matters in exhaust gas. The opening is defined at a second position of the exhaust pipe upstream of the filter. The opening directly or indirectly receives the sensor when the sensor is taken away from the first position for performing an abnormality diagnosis of the sensor. Therefore, the abnormality diagnosis can be performed without being affected by the diagnosis timing of the abnormality diagnosis and the collecting rate of the DPF.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
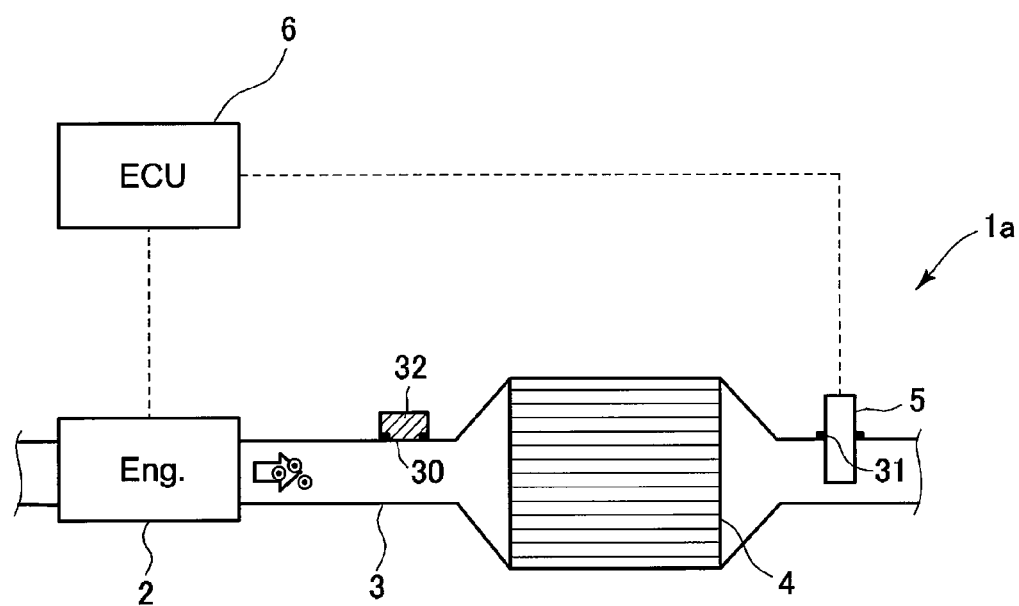
FIG. 1 is a graph showing a first exhaust gas purifying system in an ordinary mode according to a first embodiment of the present disclosure.

Hereafter, embodiments of the present disclosure will be described. The same parts and components as those in each embodiment are indicated with the same reference numerals and the same descriptions will not be reiterated.

Hereafter, embodiments of the present disclosure is described with reference to the drawings. FIGS. 1 to 9 show configurations of an exhaust gas purifying system according to each embodiment of the present disclosure. The exhaust gas purifying system is referred to as a system hereinafter.

FIGS. 1 to 5 show configurations of each system in an ordinary mode. FIGS. 6 to 9 show configurations of each system in an abnormality diagnosis mode. It should be noted that the ordinary mode represents an operation mode other than the abnormality diagnosis mode. The above configurations may be mounted on an automobile.

The present disclosure relates to an abnormality diagnosis of a particulate matter (PM) sensor which is provided at a first position downstream of a diesel particulate filter (DPF) in the ordinary mode. In the abnormality diagnosis mode, the PM sensor is moved to a position (second position) where the PM sensor is not affected by a collecting rate of the DPF. Thus, an upstream opening is provided at the second position upstream of the DPF to receive the PM sensor directly or indirectly thereto.

A first system 1a shown in FIG. 1 will be described hereinafter. The first system 1a includes an engine 2, an exhaust pipe 3, the DPF 4, the PM sensor 5, and an electronic control unit (ECU) 6.

The engine 2 which is an internal combustion engine may be a diesel engine. An exhaust gas of the engine 2 is discharged to the exhaust pipe 3. The DPF 4 is provided in the exhaust pipe 3 so as to collect the PM discharged from the engine 2.

The DPF 4 may have a honeycomb construction in which the inlet and the outlet are alternatively clogged. The exhaust gas emitted from the engine 2 includes particulate matters (PM). When the exhaust gas flows through the DPF 4, the PM are captured by an interior or exterior surface of a DPF wall. Thus, the exhaust gas discharged to exterior of the vehicle is purified. The DPF 4 may support an oxidation catalyst.

When the ECU 6 determines that an accumulated PM amount becomes large in the DPF 4, the accumulated PM are burned and eliminated to regenerate the DPF 4. A relationship (map) between the accumulated PM amount and a differential pressure is previously stored in a memory. The differential pressure is a difference between a pressure of the exhaust gas upstream of the DPF 4 and a pressure of the exhaust gas downstream of the DPF 4. The accumulated PM amount may be measured based on a detected value of a differential pressure sensor and the map. The map has a characteristic represented by a substantial parallelogram showing a relationship between the differential pressure and the accumulated PM amount. In this parallelogram graph, the vertical axis shows the differential pressure and the horizontal axis shows the accumulated PM amount. The differential pressure and the accumulated PM amount are varied as cycling along the substantial parallelogram, when the PM are accumulated or combusted.

The PM sensor 5 provided downstream of the DPF 4 detects a PM amount of an exhaust gas downstream of the DPF 4. A downstream opening 31 is defined through a peripheral wall of the exhaust pipe 3 downstream of the DPF 4 so that the PM sensor 5 can be attached to the downstream opening 31. Since the PM sensor 5 is provided downstream of the DPF 4, the PM sensor 5 can detect the PM amount which has passed through the DPF 4. Thus, it can be determined whether the DPF 4 is normal.

The downstream opening 31 may be defined through both a flange portion (not shown) of the exhaust pipe 3 and a peripheral wall of the exhaust pipe 3. The PM sensor 5 has a male screw on its external surface and the downstream opening 31 has a female screw on its internal surface so that the PM sensor 5 can be fitted to the downstream opening 31. Hereinafter, all the openings and sensors may be fitted in the same way.

The PM sensor 5 may be consisted of a plate-shaped insulation sensor element on which a pair of detecting electrodes is provided. The PM in the exhaust pipe 3 adheres to the element and accumulates thereon, according to an adhesiveness or a electrical characteristic of the PM. When the detecting electrodes are electrically connected by the PM accumulated on the element, the detecting electrodes are in a conduction state and an electrical current flows therebetween because the PM have an electrical conductivity. The electrical current is transmitted to the ECU 6 as an output of the PM sensor 5. The above PM sensor 5 is a subject sensor of the abnormality diagnosis according to the present embodiment. The PM sensor 5 may be a PM sensor having other configurations or other detecting methods.

The ECU 6 has the same configuration as a usual computer, and controls all of the processings of an exhaust gas purifying. Specifically, the ECU 6 includes a CPU which executes various computations and various commands, a volatile storage portion which is an operating area of the CPU, and a nonvolatile storage portion which stores data and programs. The volatile storage portion may be a RAM, and the nonvolatile storage portion may be a ROM or an EEPROM. Referring to the drawings, dashed lines represent communications of information. Specifically, the ECU 6 acquires a detected value of the PM sensor 5, and controls the engine 2.

In the first system 1a, a first upstream opening (first opening) 30 is defined through a peripheral wall at a position of the exhaust pipe 3 upstream of the DPF 4. In the ordinary mode, the first upstream opening 30 is closed by a cover 32, and the exhaust gas cannot be leaked from the first upstream opening 30. The cover 32 may correspond to a closing portion. The cover 32 may be made of any material such as metal, and may be configured to completely seal the first upstream opening 30. A state of the system 1a in the abnormality diagnosis mode will be described later.

A second system 1b in FIG. 2 will be described hereinafter. Hereinafter, the same parts and components as those in each embodiment are indicated with the same reference numerals and the same descriptions will not be reiterated. In the system 1b, a first sensor 7a is attached to the first upstream opening 30 in the ordinary mode. The first sensor 7a and a second sensor 7b may be any sensors, such as temperature sensors, or air-fuel (A/F) sensors. The second sensor 7b will be described later.

Figure 2:
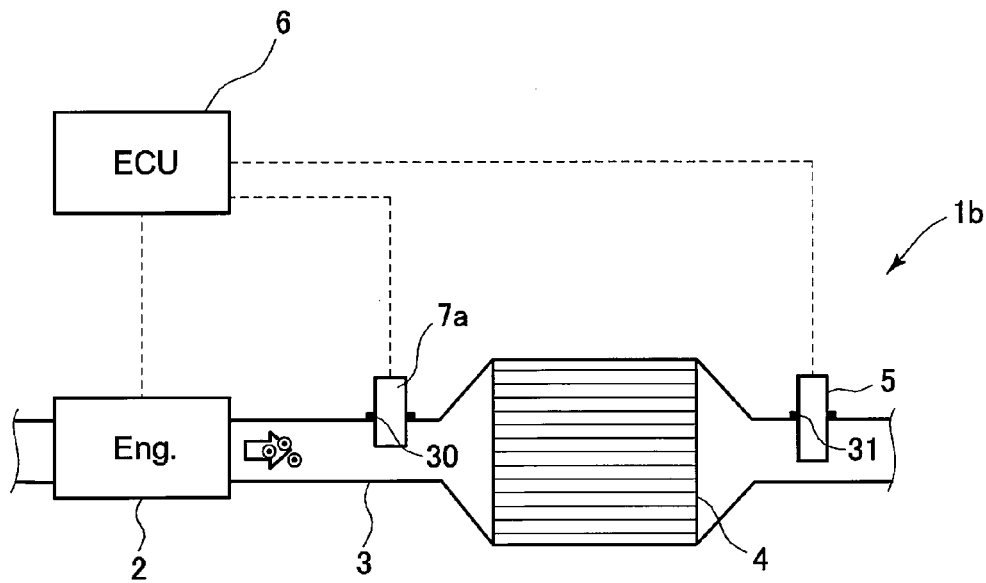
FIG. 2 is a graph showing a second exhaust gas purifying system in the ordinary mode according to a second embodiment of the present disclosure.
Figure 3:
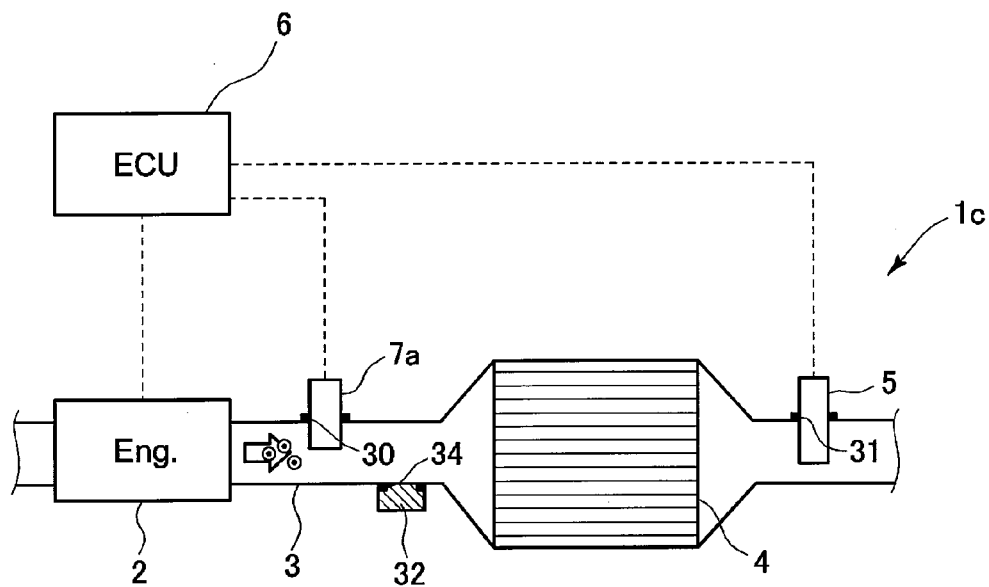
FIG. 3 is a graph showing a third exhaust gas purifying system in the ordinary mode according to a third embodiment of the present disclosure.
Figure 4:
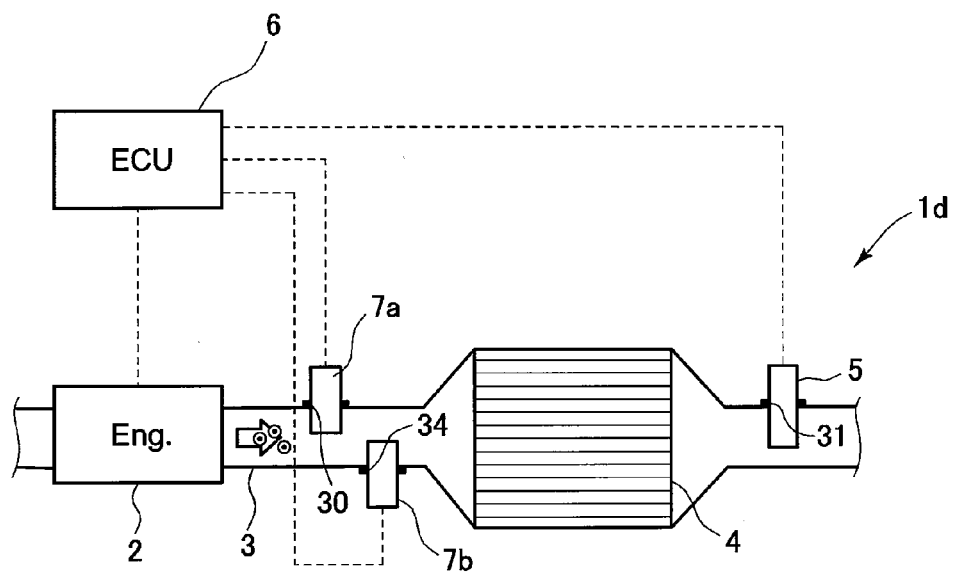
FIG. 4 is a graph showing a fourth exhaust gas purifying system in the ordinary mode according to a fourth embodiment of the present disclosure.
Figure 5:
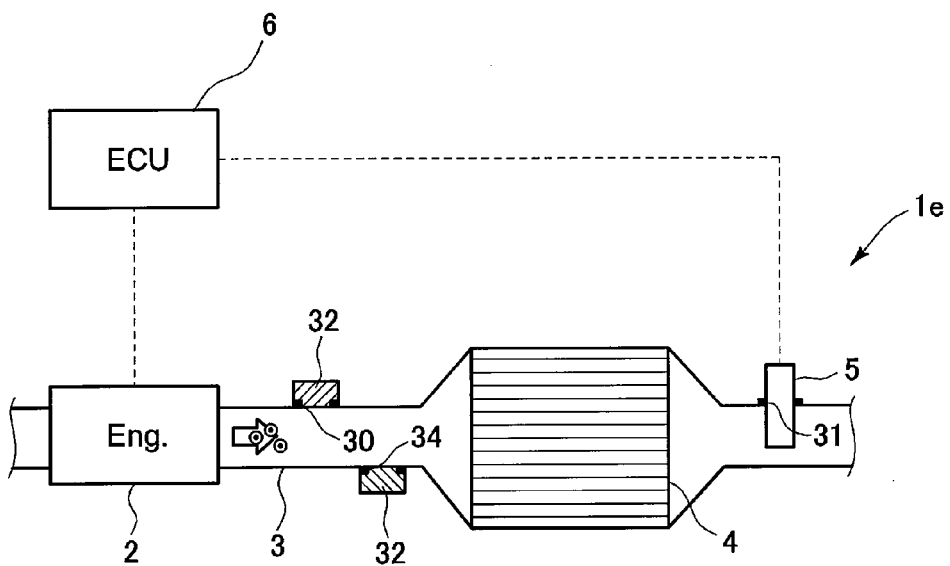
FIG. 5 is a graph showing a fifth exhaust gas purifying system in the ordinary mode according to a fifth embodiment of the present disclosure.

Referring to FIGS. 1 and 2, one opening (first upstream opening 30) is provided at a position upstream of the DPF 4. Referring to FIGS. 3 to 5, two openings are provided at a position upstream of the DPF 4. In a third system 1c shown in FIG. 3, the first upstream opening 30 and a second upstream opening (second opening) 34 are defined through two positions of the peripheral wall of the exhaust pipe 3 upstream of the DPF 4. Specifically, the first upstream opening 30 is defined at the second position, and the second upstream opening 34 is defined at a third position upstream of the DPF 4. In the ordinary mode, the first sensor 7a is attached to the first upstream opening 30, and the second upstream opening 34 is closed by the cover 32.

In a fourth system 1d shown in FIG. 4, in the ordinary mode, the first upstream opening 30 receives the first sensor 7a, and the second upstream opening 34 receives the second sensor 7b. In a fifth system 1e shown in FIG. 5, in the ordinary mode, the first upstream opening 30 and the second upstream opening 34 are both closed by the cover 32.

Figure 6:
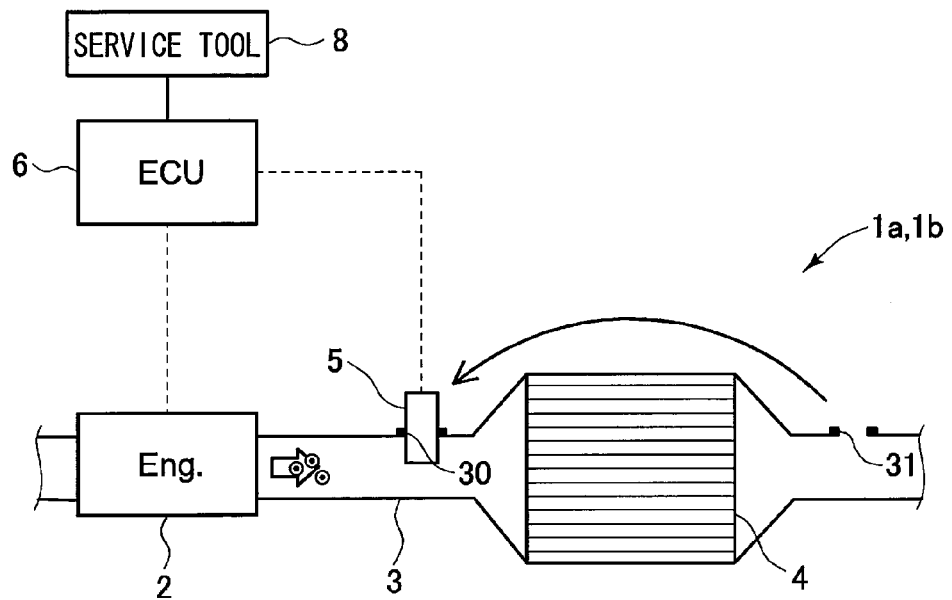
FIG. 6 is a graph showing a first diagnosis example of the first embodiment and the second embodiment in an abnormality diagnosis mode.

The state of the systems in the abnormality diagnosis mode will be described hereinafter. FIG. 6 is a first diagnosis example of the first system 1a and the second system 1b in the abnormality diagnosis mode (examine mode) to diagnose the PM sensor 5. In the first diagnosis example of the first and second systems 1a, 1b, the cover 32 or the first sensor 7a is taken away from the first upstream opening 30, and the PM sensor 5 is taken away from the downstream opening 31. Then, the PM sensor 5 is attached to the first upstream opening 30. Further, a service tool 8 is connected with the ECU 6. The service tool 8 may have a function which can diagnosis various abnormalities of a vehicle in a service shop. The service tool 8 may be configured as a usual computer. For example, the service tool 8 may include a CPU, a RAM, a ROM, a display portion, and an input portion. A diagnosis method will be described later.

Figure 7:
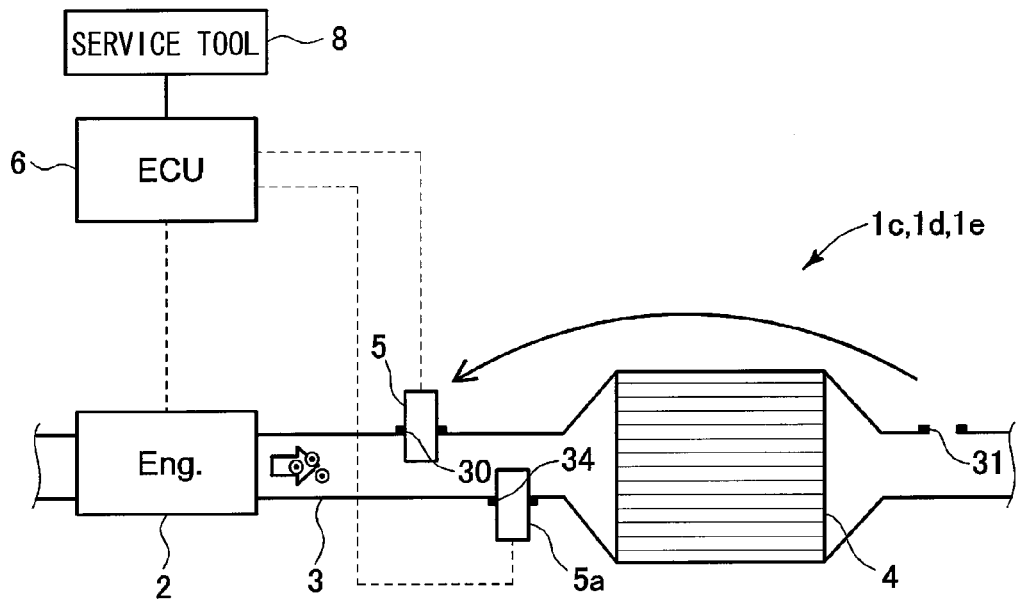
FIG. 7 is a graph showing a diagnosis example of the third embodiment, the fourth embodiment, and the fifth embodiment in the abnormality diagnosis mode.

FIG. 7 is a diagnosis example of the third system 1c, the fourth system 1d, and the fifth system 1e in the abnormality diagnosis mode to diagnose the PM sensor 5. In the diagnosis example shown in FIG. 7, the cover 32, the first sensor 7a, or the second sensor 7b is taken away from the first upstream opening 30 and the second upstream opening 34, and the PM sensor 5 is taken away from the downstream opening 31. Then, the PM sensor 5 is attached to the first upstream opening 30, and a standard PM sensor 5a is attached to the second upstream opening 34. The standard PM sensor 5a is for determining whether the PM sensor 5 is abnormal. The standard PM sensor 5a may have the same output as the PM sensor 5 when the PM sensor 5 is normal.

Figure 8:
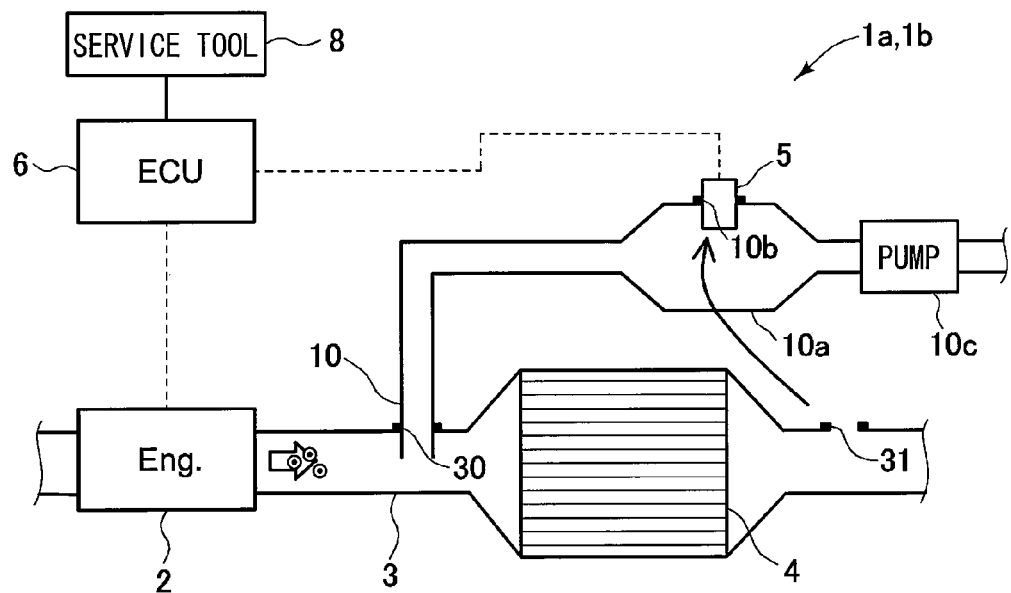
FIG. 8 is a graph showing a second diagnosis example of the first embodiment and the second embodiment in the abnormality diagnosis mode.

FIG. 8 is a second diagnosis example of the first system 1a and the second system 1b in the abnormality diagnosis mode to diagnose the PM sensor 5. In the second diagnosis example shown in FIG. 8, the cover 32 or the first sensor 7a is taken away from the first upstream opening 30, and the PM sensor 5 is taken away from the downstream opening 31. Then, a branch pipe 10 is connected to the first upstream opening 30, and the PM sensor 5 is attached to the branch pipe 10.

Specifically, the branch pipe 10 includes a large-diameter portion 10a which has a larger diameter than other parts of the branch pipe 10 so that the PM sensor 5 can be attached to the branch pipe 10, and a first branch opening 10b which is defined through a peripheral wall of the large-diameter portion 10a. The PM sensor 5 is attached to the first branch opening 10b. Thus, the PM sensor 5 is indirectly attached to the first upstream opening 30 via the branch pipe 10. A pump 10c is provided downstream of the branch pipe 10. In the abnormality diagnosis mode, the exhaust gas of the engine 2 flows toward the branch pipe 10 by a negative pressure of the pump 10c.

Figure 9:
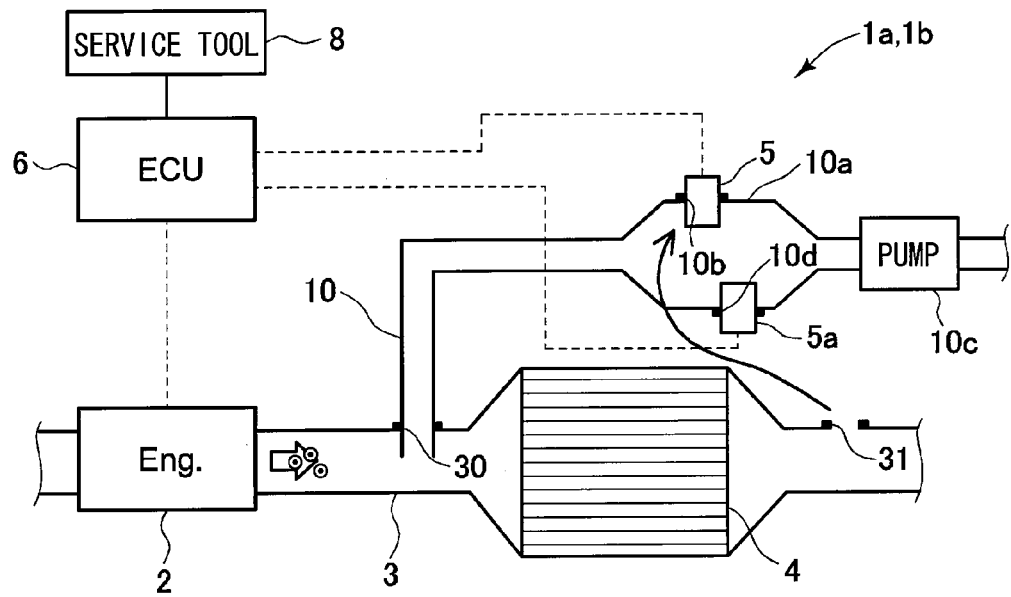
FIG. 9 is a graph showing a third diagnosis example of the first embodiment and the second embodiment in the abnormality diagnosis mode.

FIG. 9 is a third diagnosis example of the first system 1a and the second system 1b in the abnormality diagnosis mode to diagnose the PM sensor 5. In the third example of FIG. 9, the cover 32 or the first sensor 7a is taken away from the first upstream opening 30, and the PM sensor 5 is taken away from the downstream opening 31. Then, a branch pipe 10 is attached to the first upstream opening 30, and the PM sensor 5 is attached to the branch pipe 10.

Further, the first branch opening 10b and a second branch opening 10d are provided in the large-diameter portion 10a. The PM sensor 5 is attached to the first branch opening 10b, and the standard PM sensor 5a is attached to the second branch opening 10d. Thus, the PM sensor 5 is indirectly attached to the first upstream opening 30 via the branch pipe 10.

Figure 10:
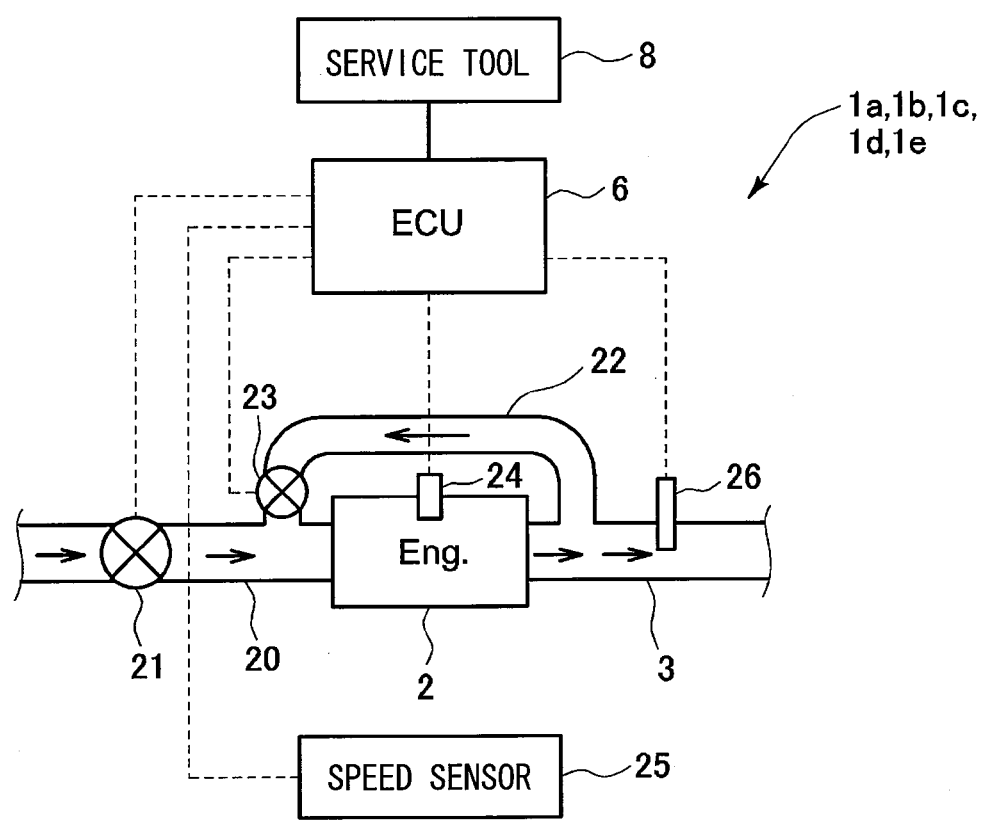
FIG. 10 is a graph showing an outline of the exhaust gas purifying system according to the present disclosure.

According to the present disclosure, a configuration shown in FIG. 10 may be used for controlling the engine 2 in the abnormality diagnosis mode. FIG. 10 is a graph showing an outline of a part of each system (1a to 1e) upstream of the first upstream opening 30, in addition of the configurations of FIGS. 1 to 9. That is, the configuration of the part of each system (1a to 1e) may be configured as shown in FIG. 10. In addition, the first upstream opening 30 may be provided at a position of the exhaust pipe 3 upstream of an A/F sensor 26.

In the configuration of FIG. 10, an intake pipe 20, an intake throttle valve 21, an exhaust gas recirculation (EGR) pipe 22, an EGR valve 23, an injector 24, a speed sensor 25, and the A/F sensor 26 are provided.

The ECU 6 adjusts an intake quantity of an intake gas flowing through the intake pipe 20 by controlling an opening degree of the intake throttle valve 21.

The ECU 6 adjusts an EGR quantity (recirculation quantity) of an EGR gas flowing through the EGR pipe 22 by controlling an opening degree of the EGR valve 23. The ECU 6 adjusts an injection time point and an injection quantity of a fuel injected into a cylinder of the engine 2 by controlling the injector 24. The speed sensor 25 detects an engine speed, and transmits the engine speed to the ECU 6. The A/F sensor 26 detects an air-fuel ratio (A/F value) in the exhaust pipe 3, and outputs the A/F value to the ECU 6.

According to the configurations of FIGS. 6 to 9 including the configuration of FIG. 10, procedures of diagnosing the PM sensor 5 are shown respectively as FIGS. 11, 14, 15, and 16. When a user (passenger) is reported from the vehicle that the normality diagnosis of the PM sensor 5 is necessary, the procedures of the normality diagnosis may be selected by the user in the service shop.

Figure 11:
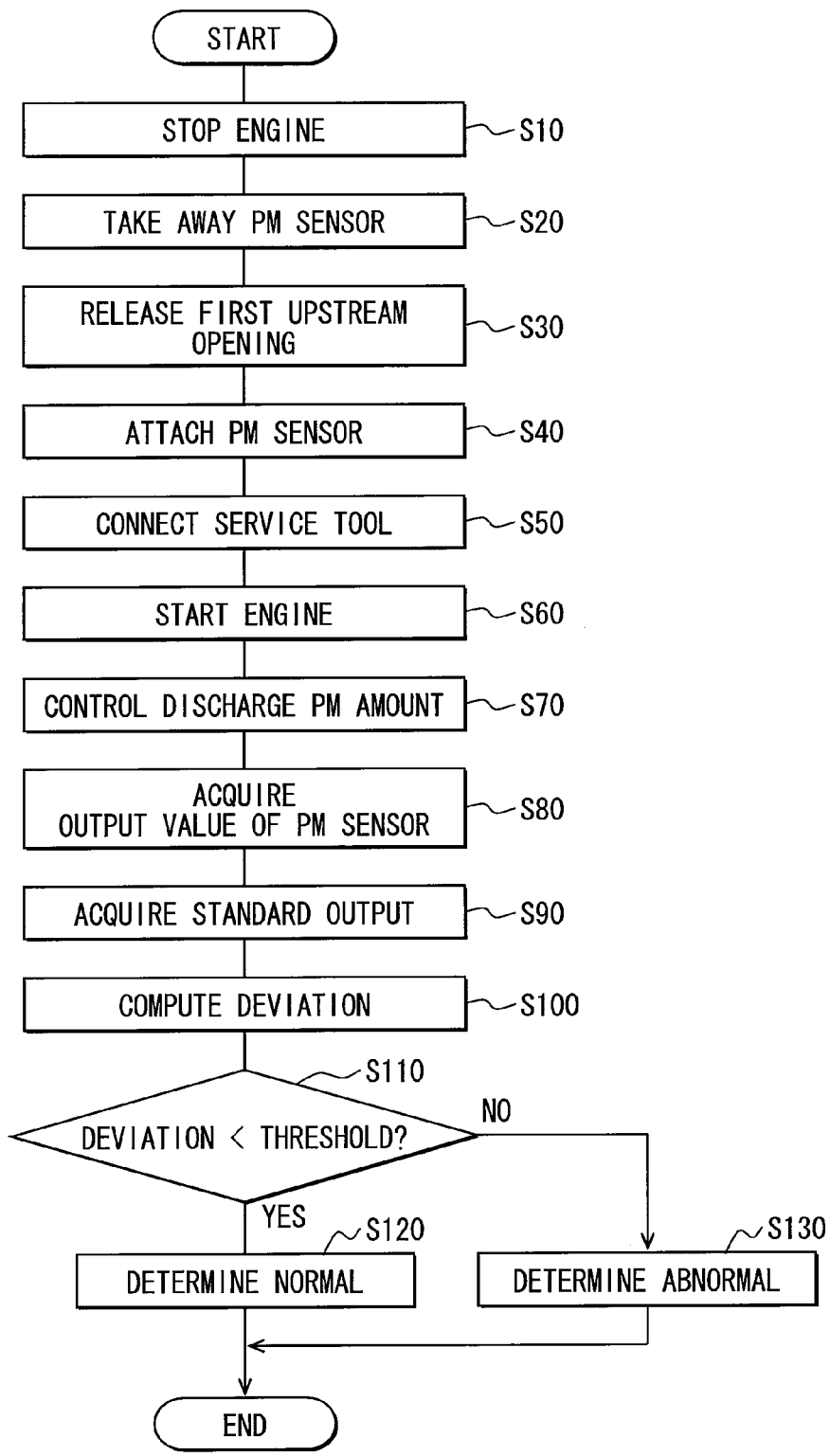
FIG. 11 is a flowchart showing an abnormality diagnosis processing shown in FIG. 6.
Figure 12:
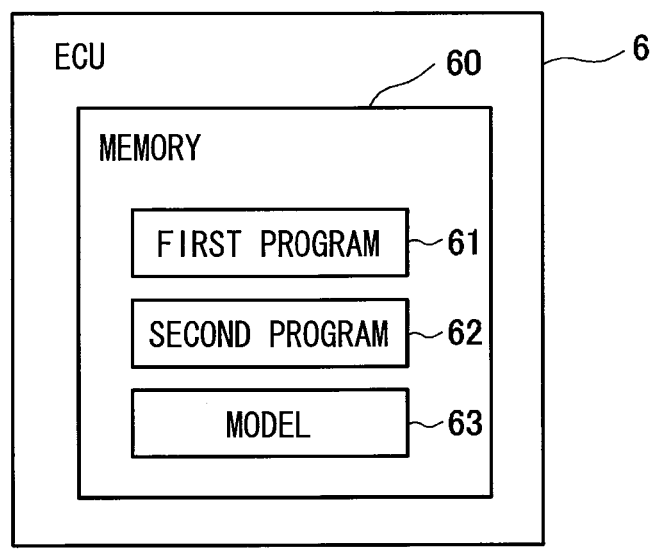
FIG. 12 is a first configuration of a memory of an ECU.
Figure 13:
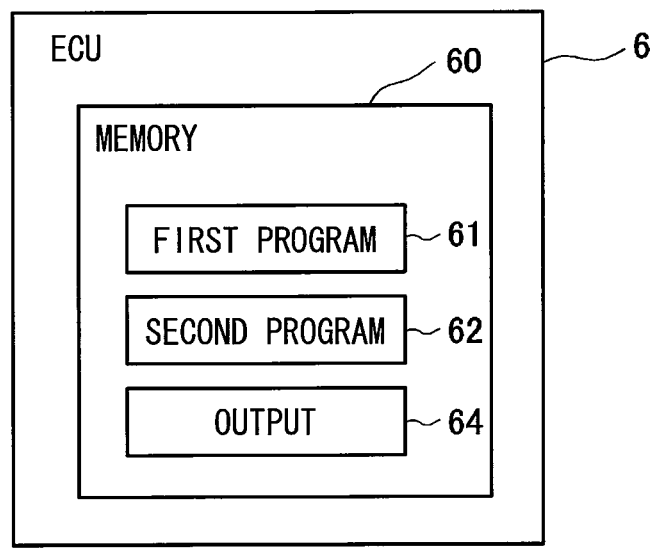
FIG. 13 is a second configuration of the memory of the ECU.

A procedure of the first diagnosis example of the first system 1a and the second system 1b shown in FIG. 6 will be described with reference to FIG. 11. The procedure shown in FIG. 11 as well as procedures shown in FIGS. 14 to 16, has a part which is automatically performed, which is referred to as a first program. As shown in FIGS. 12 and 13, the first program 61 may be previously stored in a memory 60 of the ECU 6. In this case, the memory 60 may be a permanent memory. The ECU 6 may automatically read and perform the first program 61.

At S10, the user (worker) temporarily stops the engine 2. At S20, the worker takes away the PM sensor 5 from the downstream opening 31. At S30, the worker releases the first upstream opening 30. That is, the worker takes away the cover 32 from the first upstream opening 30 as shown in FIG. 1. Alternatively, the worker takes away the standard PM sensor 5a from the first upstream opening 30 as shown in FIG. 2.

At S40, the worker attaches the PM sensor 5 taken away at S20 to the first upstream opening 30 which is open at S30. At S50, the worker connects the service tool 8 with the ECU 6. At S60, the worker starts the engine 2, and inputs predetermined commands to a predetermined input portion (not shown) provided in the service tool 8 so as to start the abnormality diagnosis. Therefore, the predetermined commands are transmitted to the ECU 6, and the processings in and after S70 is automatically performed by the ECU 6 via the first program 61.

At S70, the ECU 6 starts an increasing control of a discharge PM amount from the engine 2. In the increasing control, the discharge PM amount is relatively increased, and is maintained at a constant value or in a predetermined range. The abnormality diagnosis can be performed for a short time period by increasing the discharge PM amount. When the discharge PM amount is constant, an output value of the PM sensor 5 is a stable waveform, which is preferable to accurately perform the abnormality diagnosis.

Specifically, the increasing control may be performed in the engine 2 by the following conditions.

(1) When the intake throttle valve 21 is being closed, the intake quantity is decreased, and a combusting reaction in each cylinder is restricted. Thus, the discharge PM amount may be increased.

(2) When the EGR valve 23 is being opened, the combusting reaction in each cylinder is restricted. Thus, the discharge PM amount may be increased.

(3) As the injection time point according to the injector 24 is retarded from a top dead center, the fuel which is not completely combusted in each cylinder is increased. Thus, the discharge PM amount may be increased.

(4) In a case where the discharge PM amount of each stroke is the same, as the engine speed becomes larger, an accumulated value of the discharge PM amount is increased.

Considering the above conditions, the ECU 6 may control an opening degree of the intake throttle valve 21, an opening degree of the EGR valve 23, the injection quantity according to the injector 24, the injection time point according to the injector 24, and the engine speed to increase the discharge PM amount.

At S80, the ECU 6 acquires the output value of the PM sensor 5. At S90, the ECU 6 acquires a standard output. The standard output is the output value of the PM sensor 5 when the PM sensor 5 is normal. The standard output can be established in two configurations shown in FIGS. 12 and 13.

In the configuration of FIG. 12, a model 63 is stored in the memory 60 of the ECU 6. The model 63 is a standard model of an input-output relationship of the PM sensor 5, when the PM sensor 5 is normal. The standard model may be a model (map) showing a relationship between an operation condition of the engine 2 and the output of the standard PM sensor or a relationship between the discharge PM amount of the engine 2 per unit time period and the output of the standard PM sensor. In this case, the ECU 6 computes the standard output based on an actual control state of the engine 2 and the standard model.

In the configuration of FIG. 13, a waveform of an output 64 which is previously acquired is stored in the memory 60. In this case, the ECU 6 only reads the output 64 from the memory 60. In the configuration of FIG. 13, a time period for computing the standard output can be reduced. In the configuration of FIG. 12, the standard output with a high-accuracy with respect to the discharge PM amount from the engine 2 can be acquired.

At S100, the ECU 6 computes a deviation (difference) between the output value of the PM sensor 5 acquired at S80 and the standard output acquired at S90. The deviation may be a deviation value at any time, a deviation after a predetermined time period from a time when the normality diagnosis is started, a deviation value of a slope of waveforms when an actual output value and a standard output is increased linearly, or a difference between waveforms shown in FIG. 18 when the waveforms are raised. The ECU 6 may compute an evaluation value based on a single value of one of or a combination of the above deviations, or an accumulated value of one of or a combination of the above deviations.

At S110, the ECU 6 determines whether the deviation is smaller than a threshold. According to a result of S110, the ECU 6 determiner whether the PM sensor 5 is normal or not. Specifically, when the ECU 6 determines the deviation is smaller than the threshold (S100: YES), the ECU 6 proceeds to S120. When the ECU 6 determines the deviation is larger than or equal to the threshold (S100: NO), the ECU 6 proceeds to S130. The threshold may be previously set to a proper value. When the ECU 6 proceeds to S120, the ECU 6 determines that the PM sensor 5 is normal because the output value is close to the standard output. When the ECU 6 proceeds to S130, the ECU 6 determines that the PM sensor 5 is abnormal because the output value is far away from the standard output.

Alternatively, at S100, the ECU 6 may determine whether the deviation is positive or not. In this case, the deviation is a value subtracting the standard output from the actual output value. When the deviation is positive, the ECU 6 makes the affirmative determination (S100: YES). When the deviation is negative, the ECU 6 makes the negative determination (S100: NO). In this case, the ECU 6 determines that the PM sensor 5 is normal when the actual output value is larger than the standard output. The ECU 6 determines that the PM sensor 5 is abnormal when the actual output value is smaller than the standard output. In addition, the standard output is a lower limit value of the output value of the PM sensor 5 when the PM sensor 5 is normal. The first procedure is detailed as above. In the first procedure, because the PM sensor 5 is directly exposed in the exhaust gas of the engine 2 in the abnormality diagnosis, the abnormality diagnosis can be performed without an affect of a collecting rate of the DPF. Besides, a time point of the abnormality diagnosis may be optional.

Further, a regenerating processing of the PM sensor 5 may be performed before the engine 2 is started at S60. The regenerating processing of the PM sensor 5 is for combusting the PM adhering to the PM sensor 5. Specifically, a heater provided in the PM sensor 5 is activated to combust the PM adhering to the PM sensor 5. Then, a diagnosis can be properly started when a PM adhering amount is zero.

Figure 14:
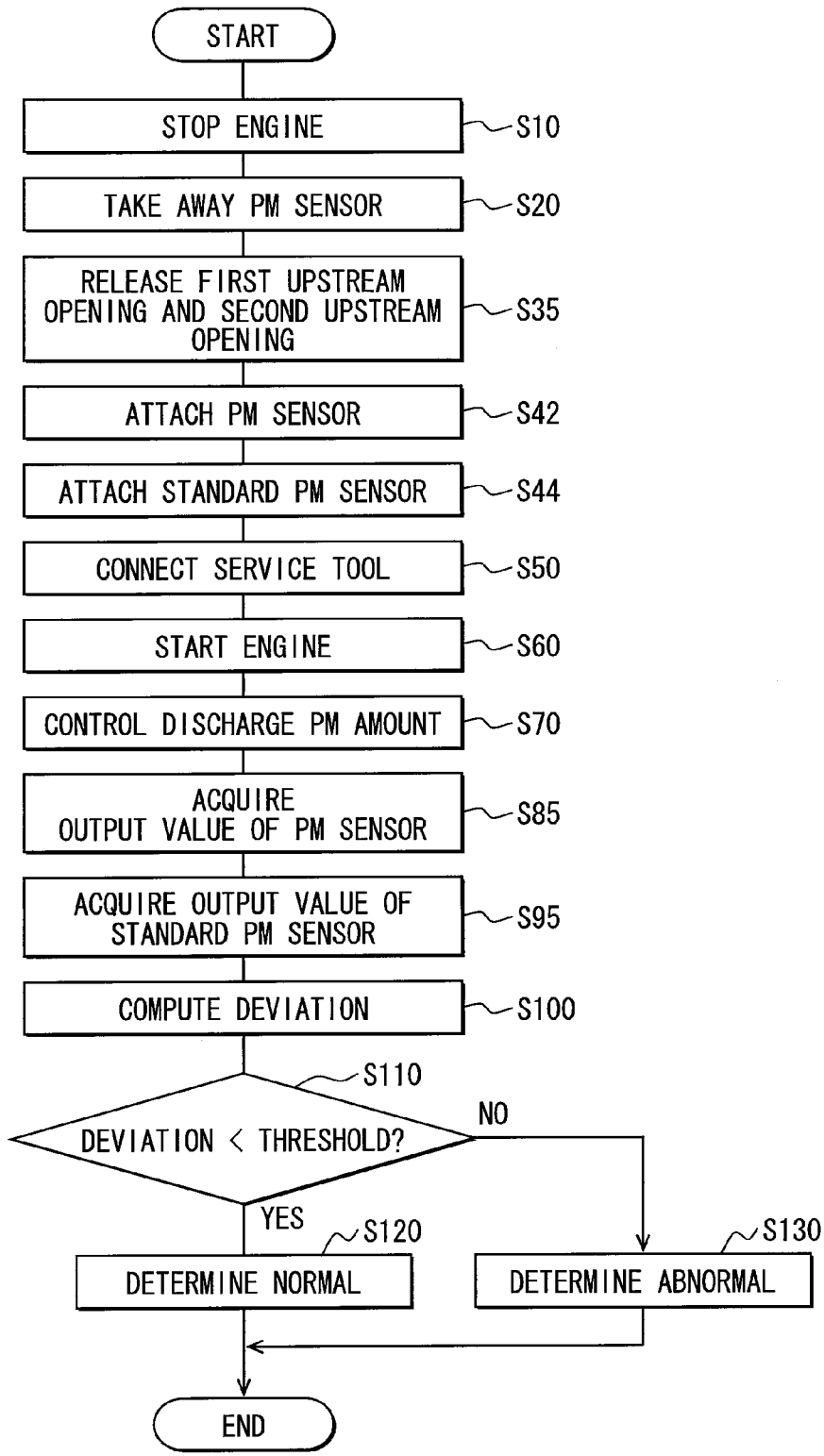
FIG. 14 is a flowchart showing an abnormality diagnosis processing shown in FIG. 7.

A procedure of the diagnosis example of the third system 1c, the fourth system 1d, and the fifth system 1e shown in FIG. 7 will be described with reference to FIG. 14. In this case, the first upstream opening 30 and the second upstream opening 34 are provided. In the ordinary mode, the first upstream opening 30 and the second upstream opening 34 have the configurations shown in FIGS. 3 to 5. Hereinafter, the above processings will be described.

At S35, the worker takes away two of the first sensor 7a, the second sensor 7b, and the cover 32 from the first upstream opening 30 and the second upstream opening 34 to release the first upstream opening 30 and the second upstream opening 34. At S42, the worker attaches the PM sensor 5 to the first upstream opening 30. At S44, the worker attaches the standard PM sensor 5a to the second upstream opening 34. According to the present disclosure, a position relationship of the PM sensor 5 and the standard PM sensor 5a is not limited. For example, the PM sensor 5 may be provided upstream of the standard PM sensor 5a as shown in FIG. 7. Alternatively, the standard PM sensor 5a may be provided upstream of the PM sensor 5. An interval between the first upstream opening 30 and the second upstream opening 34 may be optional when a upstream sensor is not affected a downstream sensor to adhere the PM.

At S85, the ECU 6 acquires the output value of the PM sensor 5. At S95, the ECU 6 acquires an output value of the standard PM sensor 5a. At S100, the ECU 6 computes a deviation (difference) between the output value of the PM sensor 5 acquired at S85 and the output value of the standard PM sensor 5a acquired at S95. The other processings are the same as those shown in FIG. 11. In the present procedure, because the PM sensor 5 and the standard PM sensor 5a are both provided downstream of the engine 2, the PM sensor 5 and the standard PM sensor 5a are in the same output state. Thus, the abnormality can be properly diagnosed.

Figure 15:
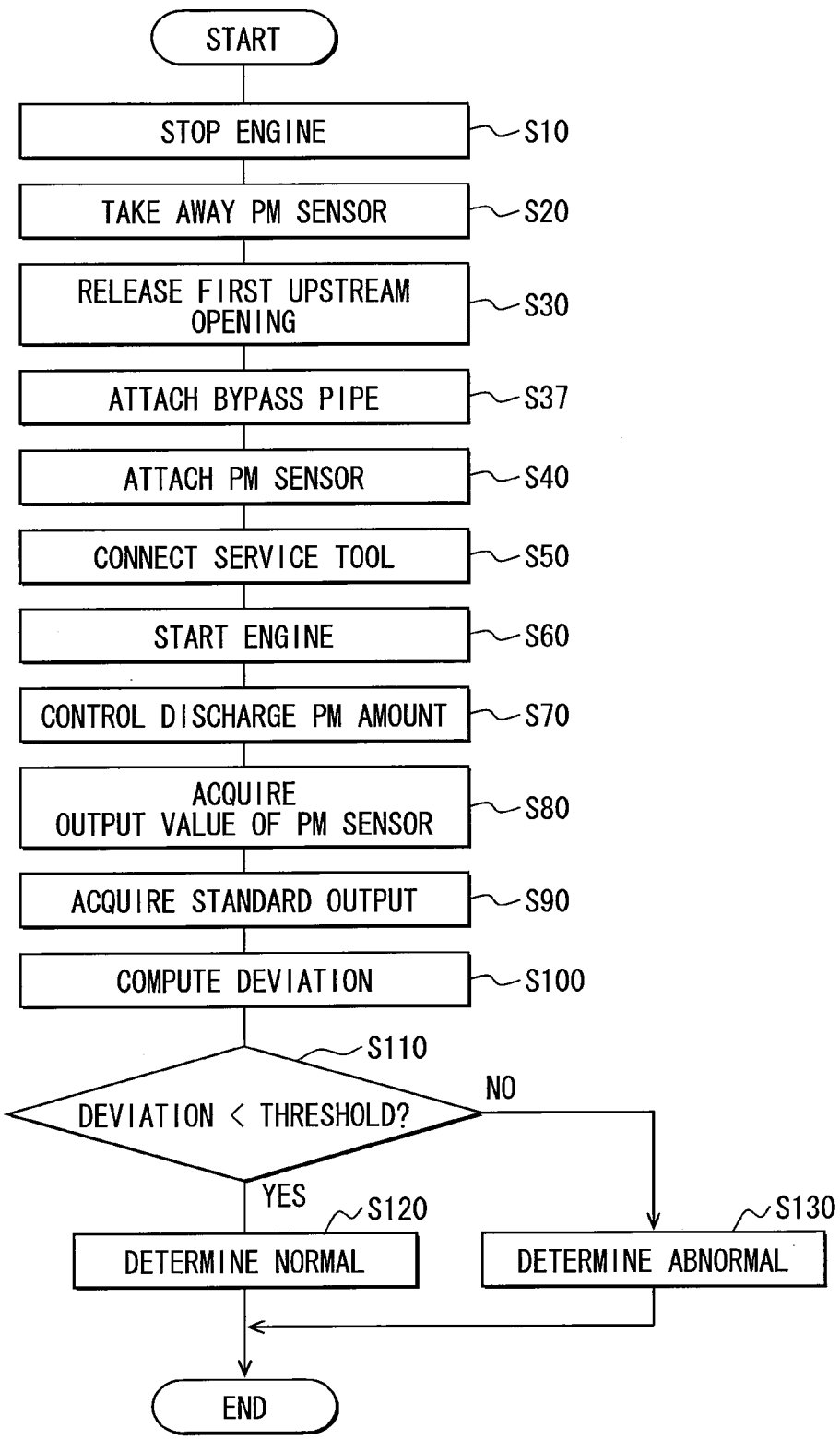
FIG. 15 is a flowchart showing an abnormality diagnosis processing shown in FIG. 8.

A procedure of the second diagnosis example of the first system 1a and the second system 1b shown in FIG. 8 will be described with reference to FIG. 15. The procedure includes a processing S37 in addition to the procedure shown in FIG. 11. At S37, the worker attaches the branch pipe 10 to the first upstream opening 30. At S40, the worker attaches the PM sensor 5 to the first branch opening 10b provided in the large-diameter portion 10a of the branch pipe 10. At S60, the worker starts the pump 10c at the same time with the engine 2. The other processings are the same as those shown in FIG. 11. In the present procedure, because the PM sensor 5 is directly exposed in the exhaust gas branched by the branch pipe 10 without passing the DPF 4, the abnormality diagnosis can be performed without the affect of the collecting rate of the DPF.

Figure 16:
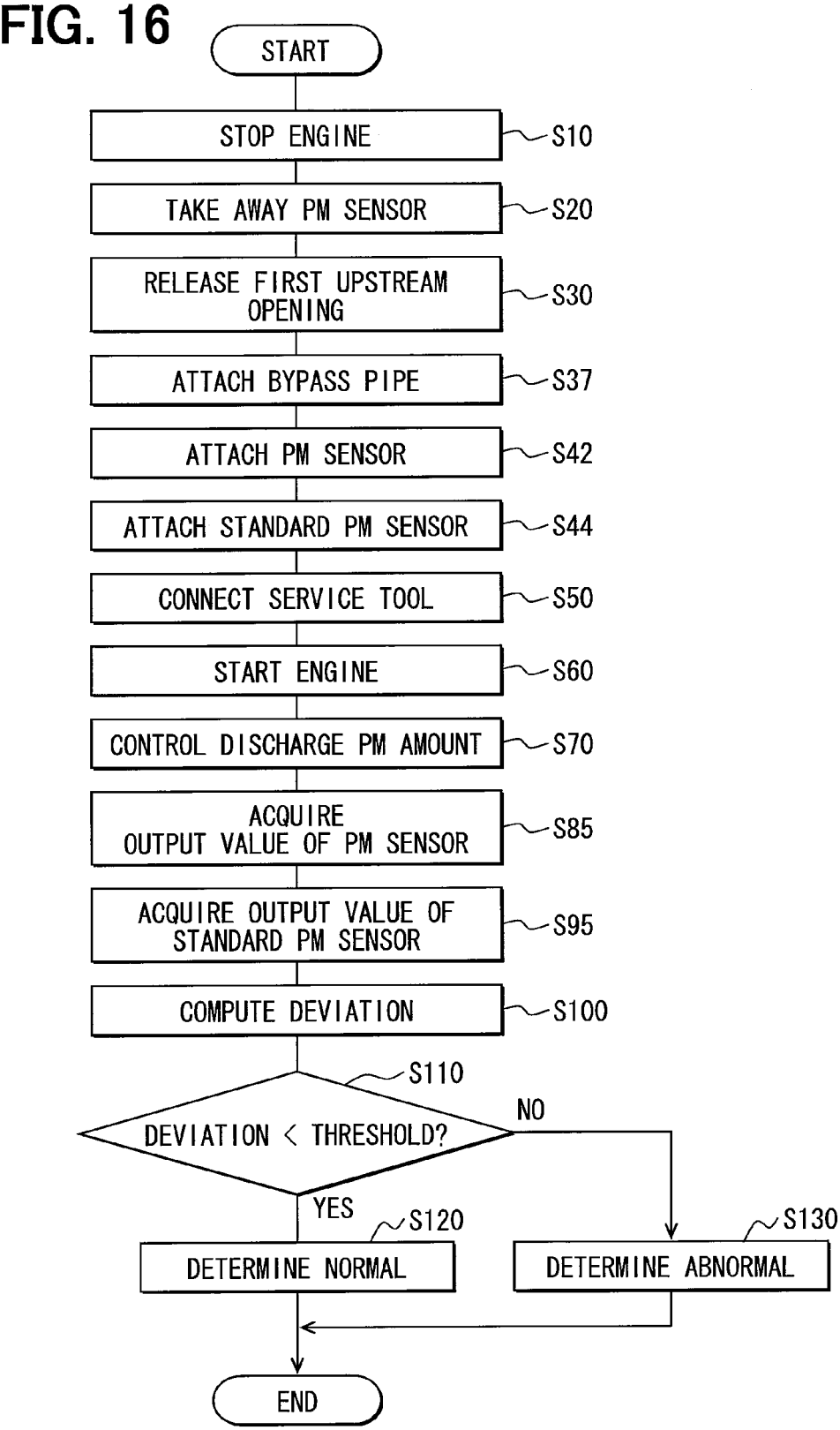
FIG. 16 is a flowchart showing an abnormality diagnosis processing shown in FIG. 9.

A procedure of the third diagnosis example of first system 1a and the second system 1b shown in FIG. 9 will be described with reference to FIG. 16. At S37, the worker attaches the branch pipe 10 to the first upstream opening 30. At S42 and S44, the worker attaches the PM sensor 5 and the standard PM sensor 5a to the first branch opening 10b and the second branch opening 10d, respectively.

At S60, the worker starts the pump 10c at the same time with the engine 2. The other processings are the same as those shown in FIG. 14. In the present procedure, because the PM sensor 5 and the standard PM sensor 5a are both provided downstream of the engine 2 by using the branch pipe 10, the PM sensor 5 and the standard PM sensor 5a are in the same output state. Thus, the abnormality can be properly diagnosed.

Figure 18:
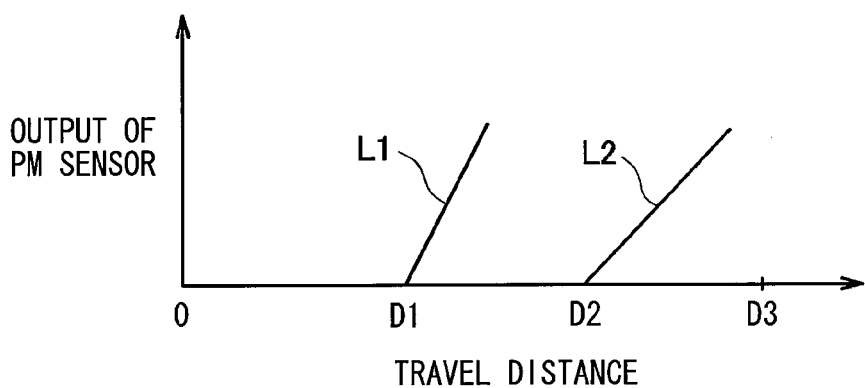
FIG. 18 is a graph showing an output waveform of a PM sensor.

FIG. 18 is a graph showing a time waveform of the output value of the PM sensor 5. In the configuration that the PM sensor 5 is provided downstream of the DPF 4, the output value of the PM sensor 5 may be a second waveform L2 when both the PM sensor 5 and the DPF 4 are normal. The second waveform L2 is zero until the detecting electrodes are connected by the PM accumulated on the element, and rises after the detecting electrodes are connected.

When the DPF 4 is abnormal, the collecting rate of the DPF 4 is decreased. For example, the output value of the PM sensor 5 may be increased as a first waveform L1 which is increased more early than the second waveform L2. Further, the first waveform L1 may have an increasing rate larger than the second waveform L2 has.

When the DPF 4 is normal, and when the PM sensor 5 is abnormal, the output value of the PM sensor 5 may be smaller than that of when the PM sensor 5 is normal. In this case, the output of the PM sensor 5 may be a waveform which is maintained at zero even though a travel distance of the vehicle reaches a point D3 shown in FIG. 18.

The subject of the abnormality diagnosis is the PM sensor 5 described above. However, it cannot be determined that the PM sensor 5 is abnormal or the collecting rate of the DPF 4 is high even though the output value of the PM sensor 5 is zero when the vehicle travels far enough.

Figure 17:
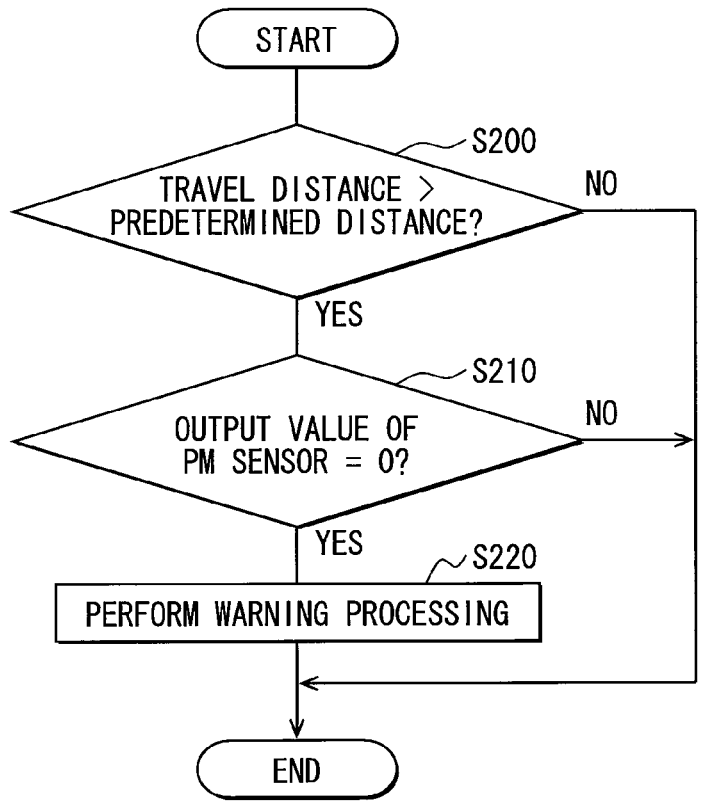
FIG. 17 is a flowchart showing a warning processing.

FIG. 17 is a graph showing an example of a warning processing for warning the user that the abnormality diagnosis of the PM sensor 5 is requested. Referring to FIGS. 12 and 13, the warning processing may be stored in the memory 60 of the ECU 6 as a second program 62, and may be automatically read and performed by the ECU 6.

In the warning processing, at S200, the ECU 6 determines whether the travel distance is larger than a predetermined distance. When the ECU 6 determines that the travel distance is larger than the predetermined distance (S200: YES), the ECU 6 proceeds to S210. When the ECU 6 determines that the travel distance is smaller than or equal to the predetermined distance (S200: NO), the ECU 6 terminates the warning processing. The travel distance may be a distance since a previous regenerating processing of the PM sensor 5 is performed. The predetermined distance may be a value according to D3 shown in FIG. 18.

At S210, the ECU 6 determines whether the output value of the PM sensor 5 is zero. When the ECU 6 determines that the output value of the PM sensor 5 is zero (S210: YES), the ECU 6 proceeds to S220. When the ECU 6 determines that the output value of the PM sensor 5 is not zero (S210: NO), the ECU 6 terminates the warning processing.

As the above description, because the PM sensor 5 is normal, the output value of the PM sensor 5 becomes larger than zero when the travel distance is larger than the predetermined value. However, at S220, the output value of the PM sensor 5 is still zero after the travel distance reaches the predetermined value. Thus, it is likely that the PM sensor 5 is abnormal. At S220, the ECU 6 performs the warning processing to warn the user that the abnormality diagnosis is necessary. For example, the ECU 6 may light up a specified lamp provided in the vehicle. The above description is the warning processing. In addition, at S210, the ECU 6 may determines whether the output value of the PM sensor 5 is smaller than or equal to a predetermined output which is not zero.

According to the present disclosure, the abnormality diagnosis can be performed anytime. Further, because the PM sensor 5 is directly exposed to the exhaust gas without passing through the DPF 4, it is avoided that the abnormality diagnosis is affected by the collecting rate of the DPF 4.

The present disclosure includes a first acquirement portion which acquires an output of a sensor provided in an opening, and a determination portion which determines whether the sensor is abnormal based on the output acquired by the first acquirement portion. The determination portion includes a second acquirement portion which acquires a standard output for the abnormality diagnosis, and a comparison portion which determines whether the sensor is abnormal by comparing the output acquired by the first acquirement portion to the standard output acquired by the second acquirement portion.

Such changes and modifications are to be understood as being within the scope of the present disclosure as defined by the appended claims. For example, the engine 2 may be a lean-burn gasoline engine instead of a diesel engine.

What is claimed is:

1. An exhaust gas purifying system for an internal combustion engine, comprising:
   a filter provided in an exhaust pipe of the internal combustion engine for collecting particulate matters;
   a moveable subject sensor provided at a first position of the exhaust pipe downstream of the filter for detecting an amount of the particulate matters in an exhaust gas; and
   a first opening defined at a second position of the exhaust pipe upstream of the filter, the first opening directly or indirectly receiving the subject sensor when the subject sensor is moved from the first position for performing an abnormality diagnosis of the subject sensor.

2. An exhaust gas purifying system according to claim 1, wherein
   when the abnormality diagnosis of the subject sensor is performed, the first opening directly receives the subject sensor moved from the first position.

3. An exhaust gas purifying system according to claim 1, further comprising:
   a second opening defined at a third position of the exhaust pipe upstream of the filter, the second opening directly receiving a standard sensor for performing the abnormality diagnosis of the subject sensor.

4. An exhaust gas purifying system according to claim 1, wherein
   when the abnormality diagnosis of the subject sensor is performed, a branch pipe is connected to the first opening, and the branch pipe has a branch opening for receiving the subject sensor moved from the first position.

5. An exhaust gas purifying system according to claim 1, further comprising:

a closing portion closing the first opening except when the abnormality diagnosis of the subject sensor is performed.

6. An exhaust gas purifying system according to claim 1, wherein the first opening receives a sensor other than the subject sensor except when the abnormality diagnosis of the subject sensor is performed.

\* \* \* \* \*